(12) United States Patent
Mozer (10) Patent No.: US 7,487,089 B2
(45) Date of Patent: Feb. 3, 2009

(54) BIOMETRIC CLIENT-SERVER SECURITY SYSTEM AND METHOD

(75) Inventor: Todd F. Mozer, Los Altos Hills, CA (US)

(73) Assignee: Sensory, Incorporated, Sunnyvale, CA (US)

( * ) Notice: Subject to any disclaimer, the term of this patent is extended or adjusted under 35 U.S.C. 154(b) by 0 days.

(21) Appl. No.: 11/726,062

(22) Filed: Mar. 20, 2007

(65) Prior Publication Data

US 2007/0198849 A1  Aug. 23, 2007

Related U.S. Application Data

(63) Continuation of application No. 09/875,261, filed on Jun. 5, 2001, now abandoned.

(51) Int. Cl.
  G10L 17/00  (2006.01)
  G10L 15/22  (2006.01)
  G06K 9/00  (2006.01)

(52) U.S. Cl. .............. 704/246; 704/270.1; 704/273; 382/116

(58) Field of Classification Search .......... 704/232, 704/233, 246, 256.1, 270.1, 273; 382/115, 382/116
  See application file for complete search history.

(56) References Cited

U.S. PATENT DOCUMENTS

| | | | | |
|---|---|---|---|---|
| 5,339,361 A * | 8/1994 | Schwalm et al. | ............ | 713/169 |
| 5,705,993 A * | 1/1998 | Alesu | ......................... | 340/5.86 |
| 5,774,858 A * | 6/1998 | Taubkin et al. | ............... | 704/273 |
| 5,805,674 A * | 9/1998 | Anderson, Jr. | ........... | 379/93.03 |
| 6,035,406 A * | 3/2000 | Moussa et al. | ................ | 726/18 |
| 6,049,785 A | 4/2000 | Gifford | | |
| 6,219,639 B1 * | 4/2001 | Bakis et al. | ................. | 704/246 |
| 6,246,988 B1 * | 6/2001 | Schier | ........................ | 704/273 |
| 6,292,782 B1 * | 9/2001 | Weideman | ................... | 704/273 |
| 6,430,305 B1 * | 8/2002 | Decker | ....................... | 382/116 |
| 6,480,825 B1 * | 11/2002 | Sharma et al. | ............. | 704/270 |
| 6,496,595 B1 * | 12/2002 | Puchek et al. | ............... | 382/124 |
| 6,498,970 B2 * | 12/2002 | Colmenarez et al. | ......... | 701/36 |
| 6,510,236 B1 * | 1/2003 | Crane et al. | ................. | 382/116 |
| 6,510,415 B1 * | 1/2003 | Talmor et al. | ............... | 704/273 |
| 6,556,127 B1 * | 4/2003 | Moser et al. | ................ | 340/5.84 |
| 6,657,538 B1 | 12/2003 | Ritter | | |
| 6,691,089 B1 | 2/2004 | Su et al. | | |
| 6,700,953 B1 | 3/2004 | Maurer et al. | | |
| 6,785,647 B2 * | 8/2004 | Hutchison | ................... | 704/231 |
| 6,907,135 B2 * | 6/2005 | Gifford et al. | ............... | 382/117 |

\* cited by examiner

*Primary Examiner*—Martin Lerner
(74) *Attorney, Agent, or Firm*—Chad R. Walsh; Fountainhead Law Group P.C.

(57) ABSTRACT

The present invention includes a client-server security system. The client-server security system includes a client system receiving first biometric data and having a first level security authorization procedure. In one embodiment, the first biometric data is speech data and the first level security authorization procedure includes a first speaker recognition algorithm. A server system is provided for receiving second biometric data. The server system includes a second level security authorization procedure. In one embodiment, the second biometric data is speech data and the second level security authorization procedure includes a second speaker recognition algorithm. In one embodiment, the first level security authorization procedure and the second level security authorization procedure comprise distinct biometric algorithms.

34 Claims, 5 Drawing Sheets

BIOMETRIC CLIENT-SERVER SECURITY SYSTEM AND METHOD

CROSS REFERENCE TO RELATED APPLICATIONS

This invention is a continuation of and claims the benefit of priority from U.S. patent application Ser. No. 09/875,261, filed Jun. 5, 2001, entitled "Client-Server Security System and Method."

BACKGROUND

The present invention relates to systems and methods for implementing security features into electronic systems. More particularly, the present invention relates to security systems and methods implemented in a client-server system utilizing biometrics.

Figure 1:
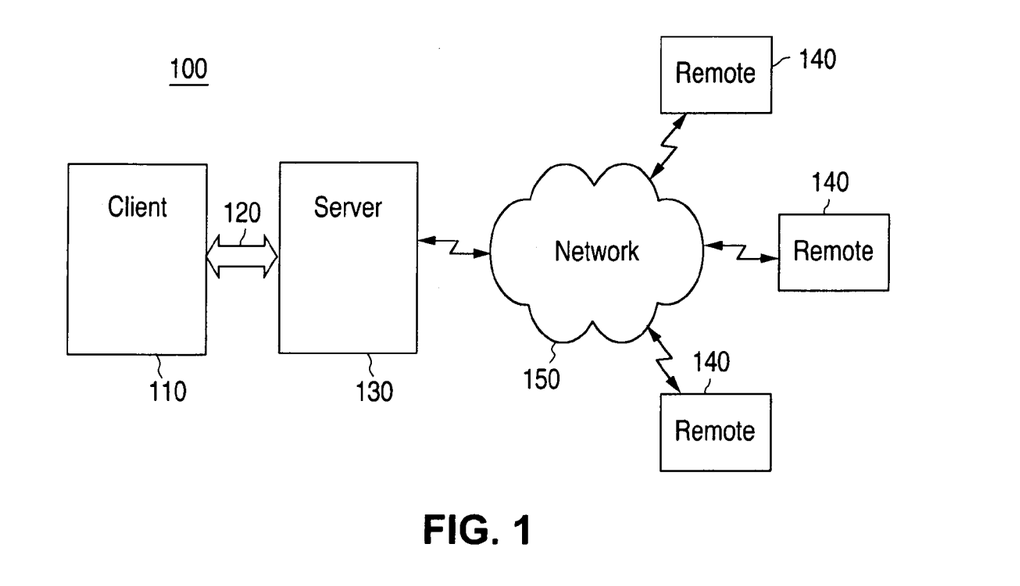
FIG. 1 illustrates a client-server system.

FIG. 1 illustrates a typical client-server system 100. Client-server systems typically include a client system 110 coupled to a server system 130 by a communication channel 120. The server system 130 may then be coupled to remote resources 140. For example, the server system may be coupled to remote resources over a network 150, such as a local area network, a wide area network, telecommunications network, or other types data communications networks. The remote resources may be additional server systems, data storage networks, or other types of data processing systems.

In the client-server system 100, a user will typically access resources on the server system 130 or remote resources 140 through the client system 110. However, one problem associated with client-server systems is that security on such systems can be difficult to implement effectively. For example, a particular user of a client system 110 may wish to carry out operations or transactions on the server system 130 or remote resources 140 in a secure environment. Traditional security systems for establishing a secure environment on a client-server system have either implemented security features solely into the server system 130 or solely into the client system 110. However, security systems implemented solely on the server system 130 have the disadvantage of being susceptible to hacking or other forms of electronic attack. Additionally, such systems require that security data be sent across a transmission medium which may result in degradation or distortion of the data, thereby leading to a reduction in the quality of the security data and a compromise of the integrity of the security system. On the other hand, security systems implemented solely on the client system 110 have the disadvantage of being constrained by the limited resources of the client system 110.

Therefore, what is needed is a more effective system and method for ensuring a secure environment for a user of a client-server system.

SUMMARY

In accordance with one embodiment of the present invention, a client-server security system includes a client system receiving first biometric data and having a first level security authorization procedure and a server system receiving second biometric data and having a second level security authorization procedure. The first level security authorization procedure and the second level security authorization procedure may comprise distinct biometric algorithms.

Another embodiment of the present invention includes a method of performing a secured transaction on a server system. The method includes receiving a first level security authorization signal on the server system from a client system, receiving biometric data on the server system from the client system, analyzing the biometric data using a first biometric algorithm on the server system, and generating a second level security authorization signal on the server system when the first biometric algorithm indicates that the biometric data corresponds to one of a plurality of users authorized to access the server system.

In yet another embodiment of the present invention, a method of performing a secured transaction on a client system includes receiving biometric data in the client system, analyzing a first portion of the biometric data using a first biometric algorithm on the client system, generating a first level security authorization signal on the client system when the first biometric algorithm indicates that the first portion of the biometric data corresponds to an authorized user, generating control information, and transmitting the first level security authorization signal, a second portion of the biometric data, and the control information to a server system, the second portion of biometric data being analyzed by a second biometric algorithm on the server. The method also includes accessing resources on the server system through the client system when the second biometric algorithm provides a second level security authorization.

The following detailed description and the accompanying drawings provide a better understanding of the nature and advantages of the present invention.

BRIEF DESCRIPTION OF THE DRAWINGS

FIG. 10 shows a system where a single user may have multiple client systems for accessing a server system.

DETAILED DESCRIPTION

Figure 2:
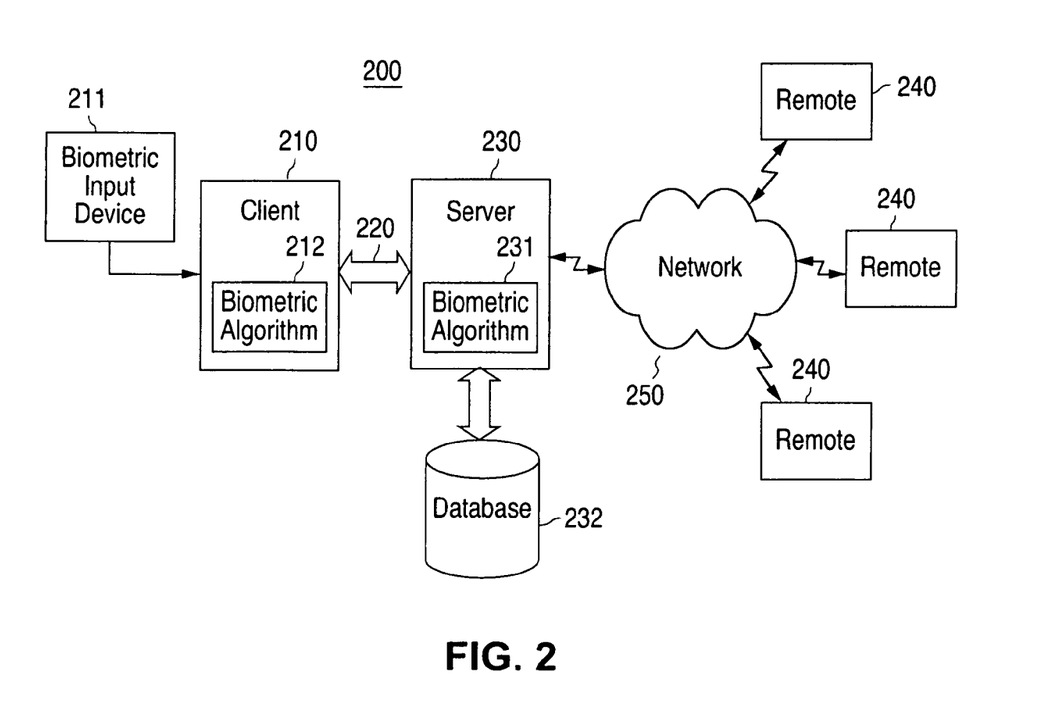
FIG. 2 illustrates a client-server system including a security system according to one embodiment of the present invention.

FIG. 2 illustrates a client-server system 200 including a security system according to one embodiment of the present invention. Client-server system 200 includes a client system 210 coupled to a server system 230 by a communication channel 220. The server system 230 may then be coupled to remote system resources 240 over a network 250. Accordingly, the client system 210 may act as the entry point for providing a user with access to the resources on the server system 230 and remote systems 240. Moreover, the server system 230 may act as a gateway for providing a user with access to remote resources on remote systems. For example, the server system 230 may be coupled to remote resource systems 240 over the network 250, which may be a local area network, a wide area network, telecommunications network, or other types communication network. Of course, it is to be understood that in some embodiments, other intermediate servers may be utilized between the client and the gateway server. Therefore, a client may be coupled to the gateway server directly over a communication channel 220, or the client may access the gateway server through a network with other servers in between the client system 210 and gateway server system 230.

In one embodiment, the client system may be a personal computer system, for example. In another embodiment, the client may be a thin client computer system. In yet other embodiments of the present invention, the client system may be a portable phone (e.g., a cellular phone), personal digital assistant ("PDA"), portable media player (e.g., MP3 player or walkman), electronic watch, internet appliance, smart card, electronic wallet, pager, set-top box, automotive information system, or any other personal electronic client system.

The client system 210 includes a biometric input device 211 for gathering biometric data of a user. Generally, biometrics is the study of parameterized biological data ("biometric data") associated with one or more individuals, and biometric data is biological data unique to an individual. The biometric data gathered on the client system 210 generally includes digital representations of characteristic biological features of the user. For example, such features may include, but are not limited to, genetic composition, fingerprint patterns, facial shape or facial patterns, handprints or hand geometry, cornea patterns, iris or retinal patterns, voice or speech characteristics, or any other biological features or characteristics which are useful in identifying particular individuals. Accordingly, in one embodiment the biometric input device 211 may be a microphone for gathering audio information (i.e. speech data of a particular user). In another embodiment, the biometric input device 211 may be a fingerprint scanner for gathering biometric data associated with the fingerprint of a user. In yet other embodiments, the biometric input device 211 may be a retinal scanner, handprint analyzer, or any other device for creating a digital representation of biometric data as are well known by those skilled in the art.

The biometric data received by the biometric input device 211 may be processed by a client biometric algorithm 212 residing on the client system 210. The client biometric algorithm 212 performs a first level security authorization. In one embodiment discussed in more detail below, the first level security authorization is a user verification. User verification is the process of determining if the biometric data received from the biometric input device matches an authorized user. For example, if a PDA belongs to a particular user with a particular speech pattern for a specific password (e.g., the users speech pattern for the word "enter"), then biometric speech data received from a biometric input device, such as a microphone, will be processed by a client biometric algorithm, such as a speech analysis algorithm, to determine if the password spoken by the user (e.g., "enter") matches the an expected speech pattern for the word "enter." If the biometric data received matches the biometric data of an authorized user, then the algorithm verifies that the user is an authorized user. Of course, other techniques for implementing the first level security authorization could be used. The client biometric algorithm 212 may be implemented in software, hardware, or by a combination of hardware and software. In one embodiment, the client biometric algorithm includes a neural network for processing the biometric data, for example. The client may be coupled to the server system 230 through the communication channel 220. The communication channel 220 may be any form of wired or wireless channel as is well known by those skilled in the art.

The server system 230 includes a server biometric algorithm 231. The server system 230 may also include a database 232. The server biometric algorithm 231 performs a second level of security authorization. In one embodiment, the second level security authorization is a user identification. User identification is the process of determining if the particular user is one of a plurality of authorized users. For example, database 232 may include biometric data, such as biometric signature characteristics, for many authorized users. User identification may comprise receiving biometric data, and analyzing the biometric data using the biometric algorithm to determine if the received biometric data matches the biometric data for one of the authorized users stored in the database 232. Of course, other techniques for implementing the second level security authorization could be used. The server biometric algorithm 231 may be implemented in software, hardware, or by a combination of hardware and software. In one embodiment, the server biometric algorithm includes a template matching algorithm, for example.

Figure 3:
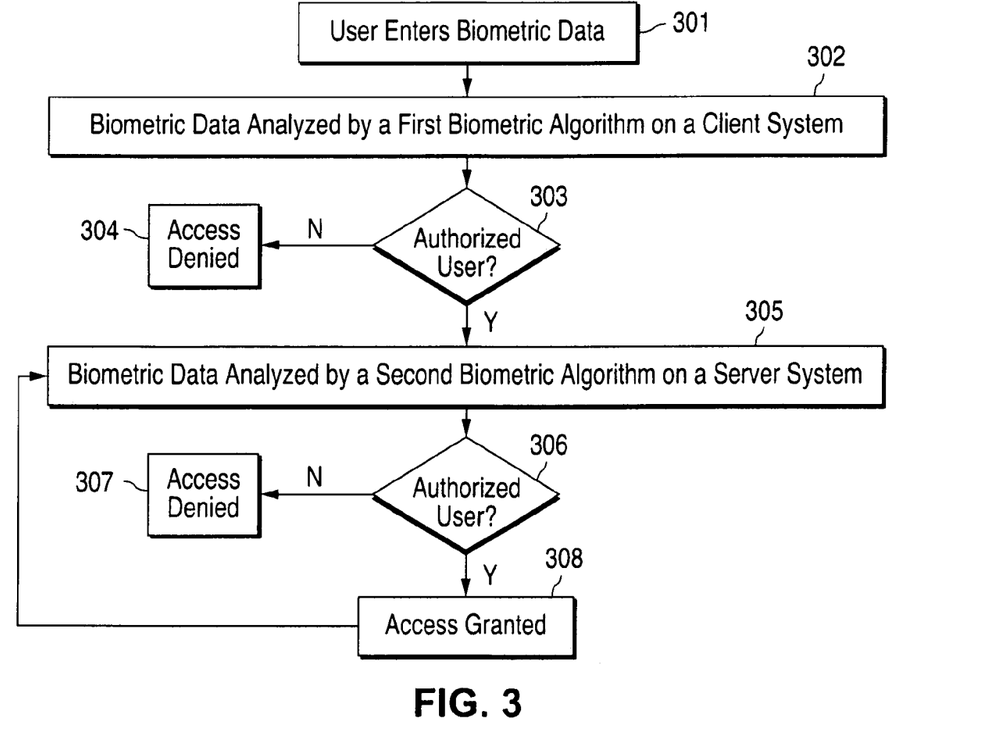
FIG. 3 illustrates a method of providing a secure environment according to one embodiment of the present invention.

FIG. 3 illustrates a method of providing a secure environment using the client-server system of FIG. 2 according to one embodiment of the present invention. At step 301 a user enters biometric data using the biometric input device 211. A first level security authorization procedure is carried out at steps 302 and 303 on the client. At step 302, first biometric data from the biometric data entered into the input device is analyzed by a client biometric algorithm 212 residing on client system 210. The results of the client biometric algorithm analysis of the first biometric data are then used to authorize the user at step 303. If the first biometric data does not correspond to an authorized user of the client system 210, then the user is denied access to the client system 210 at step 304. However, if the first biometric data corresponds to an authorized user of client system 210, then a first level security authorization signal is generated by the client and transmitted to the server.

A second level security authorization procedure is carried out at steps 305 and 306 on the server. At step 305, in response to receiving the first level security authorization signal, second biometric data from the biometric data entered into the biometric input device 211 on client system 210 is analyzed by the server biometric algorithm 231. It is to be understood that the second biometric data may be entered into the client before or after the first level security authorization. The results of the server biometric algorithm analysis are then used to authorize the user at step 306. If the second biometric data does not correspond to an authorized user of the server system 230, then the user is denied access to the server system 230 at step 307. However, when the server biometric algorithm indicates that the second biometric data corresponds to one of a plurality of users authorized to access the server system 230, then a second level security authorization signal is generated at step 308, and the user may be granted access to the resources on the server system. Additionally, the second level security authorization signal may also allow the user to access remote resources 240.

According to one embodiment of the present invention, after the user has been granted access at step 308, the server may re-execute the second level security authorization on the user. In one embodiment, the server performs an additional second level security authorizations randomly while the user is connected. In another embodiment, the server performs additional second level security authorizations on a periodic basis according to a defined time period (e.g., every minute, 10 minutes, or hour). In yet other embodiments, second level security authorizations may be performed according to heuristic algorithms. For example, after being granted first and second level security authorizations, a user may engage in a speech controlled transaction (e.g., voice over IP), whereby speech commands are input to the client, transmitted from the client to the server, and used to access or control server or remote resources. During the speech transaction, the server may seamlessly sample speech data and re-execute the second level security authorization. For yet another example, the server may cause a prompt to be issued to the user to enter additional biometric data (e.g., a mother's maiden name) to perform an additional second level security authorization. Occasional re-execution of the second level security authorization according to the above described techniques has the effect of increasing the confidence level of the system, thereby improving the integrity of the security system.

In one embodiment, the client biometric algorithm 212 and the server biometric algorithm 231 are distinct biometric algorithms. For example, the client biometric algorithm may be a neural network algorithm and the server biometric algorithm may be a pattern matching (i.e. template matching) algorithm. Accordingly, the likelihood of a valid authorization is thereby increased. In another embodiment, the client and server biometric algorithms analyze different portions of the biometric data. For example, if the biometric data is speech data, then the client biometric algorithm may analyze a spoken password and the server biometric algorithm may analyze some spoken phrase or word other than the password. For another example, if the biometric data is a digitized fingerprint, then the client biometric algorithm may analyze a first characteristic of the fingerprint, such as feature distances, and the server biometric algorithm may analyze another characteristic of the fingerprint, such as a feature geometry.

In another embodiment, the biometric input device 211 receives first biometric data, analyzes the first biometric data, and completes the first level security authorization before receiving second biometric data for the second level security authorization. Accordingly, second biometric data, which is received after the first level security authorization, may be used to carry out the second level security authorization on the server after the client has authorized the user. For example, a user of a client system may speak a password (i.e., first biometric data) for the first level security authorization. Then, after the first level security authorization has been completed, the user may say another password (i.e., second biometric data), or alternatively, a phrase or utterance. The phrase or utterance may then be transmitted to the server to perform the second level security authorization on the server system. In another embodiment, the first and second biometric data may both be entered before the first and second security authorizations.

According to other embodiments of the present invention, different biometric data may be used as inputs to the client and server biometric algorithms for performing the first and second level security authorizations. For example, speech data may be used to perform the first level security authorization on the client system (e.g., a password). Then, a digital fingerprint could be used to perform the second level security authorization on the server system. Of course, various combinations of the following biometric features could be used as inputs to the client and server biometric algorithms: genetic composition, fingerprint patterns, facial shape or facial patterns, handprints or hand geometry, cornea patterns, iris or retinal patterns, voice or speech characteristics, or any other biological features or characteristics.

The combined first and second levels of security authorization according to embodiments of the present invention will provide improved security in the system and a reduction in security error rates. For example, one metric useful in characterizing systems utilizing biometric data that is improved by the techniques of the present invention is the Equal Error Rate ("EER"). The EER may be understood by first noting that the client biometric algorithm may not be operating at an optimum because of limited resources on the client (e.g., a cellphone or other client may have less MIPS, memory, etc. for optimum performance of the neural network). As a result, the possibility of error in the first level security authorization may be increased. For example, limited resources may result in a higher probability that the algorithm will incorrectly deny access to an authorized user (i.e. false negative). Additionally, there is also a higher probability that the algorithm will incorrectly allow access to an unauthorized user (i.e. false positive). However, if the acceptance threshold for the first level security authorization is increased, the probability of a false positive may be decreased, but the probability of a false negative will correspondingly increase. Accordingly, the EER is a system metric that is defined as the point at which the probability of a false positive is equal to the probability of a false negative (i.e. the point at which the error rates are equal). Additionally, the EER of the server system may be impacted by the quality of the communication channel (e.g., channel noise, distortion, or data errors). Therefore, forcing a high security acceptance threshold may result in a failure to grant access to an authorized user of the server because the quality of the biometric data may be degraded during transmission between the client and the server. Alternatively, reducing the acceptance threshold can result in granting access to an unauthorized user of the server. However, by providing first and second levels of security authorization according to the techniques of the present invention, the EER of the system may be improved, resulting in enhanced security in the client-server system.

Figure 4:
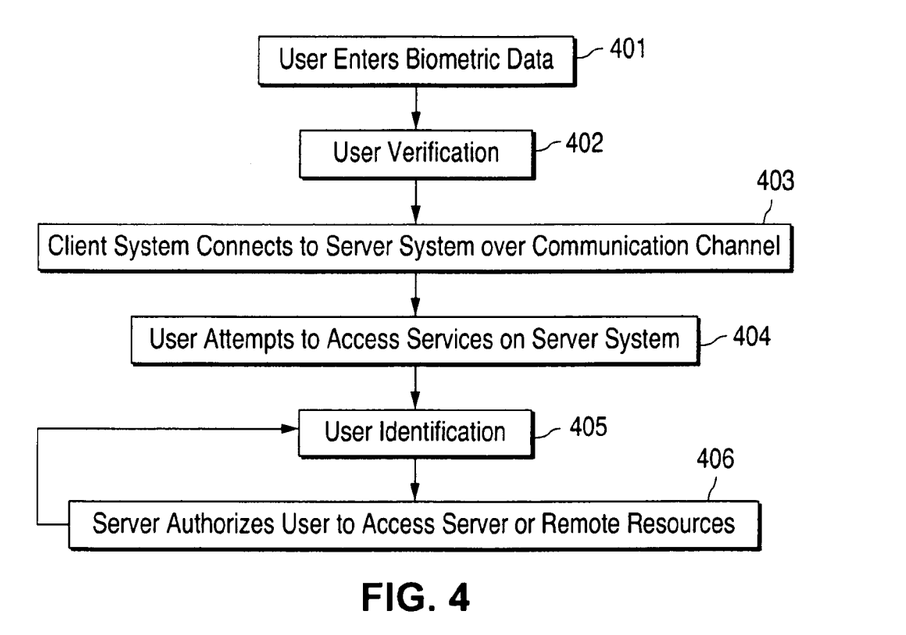
FIG. 4 illustrates a method of providing a secure environment according to another embodiment of the present invention.

FIG. 4 illustrates a method of providing a secure environment according to another embodiment of the present invention. At step 401, a user enters biometric data into a client system. In one embodiment the biometric data is speech data, and the user may speak a password, for example. At step 402, the client perform user verification. For the present embodiment, user verification is the first level security authorization. In one embodiment, the user verification comprises receiving biometric data in the form of a speech data corresponding to a user speaking a specific predetermined word or phrase (e.g., a password), and analyzing the speech data using a first speaker recognition algorithm (e.g., a neural network). The first speaker recognition algorithm will determine if the received voice matches an authorized voice. Additionally, in another embodiment, the first speaker recognition algorithm may determine if the received word or phrase matches an authorized word or phrase. Accordingly, using speech data for user verification as the first level security authorization, the client system 210 determines if the voice belongs to an authorized user of the client system 210 (e.g., the owner of the cellphone, PDA, or thin client computer system), and may additionally determine if the authorized user spoke the correct word or phrase. If the voice and password are verified by the first speaker recognition algorithm, then a first level authorization signal is generated by the client and may be transmitted to a server. After the user is verified, the client system may allow the user to connect to the server system over the communication channel 220 of FIG. 2 at step 403. Accordingly, using user verification, a client system may control the entry point of users onto a network.

At step 404, the user of the client system may attempt to access services provided by the server system. At step 405, the server system performs user identification. For the present embodiment, user identification is the second level security authorization. In one embodiment, user identification comprises receiving biometric data and analyzing the biometric data using a server biometric algorithm to determine if the user is authorized to access the server (e.g., one of the persons registered with a particular service provider). The database may contain biometric data, such as biometric signature characteristics, that may be used by the server biometric algorithm. Therefore, if the received biometric data matches biometric data for a user in a database of users, then a second level security authorization is granted. In one exemplary embodiment, the biometric data is speech data. Accordingly, the server may include a database of speech data corresponding to authorized users of the server. For example, the server may contain a digital files that include voice spectral distributions of a particular users voice pattern useful for implementing vocabulary independent speaker identification. The server may analyze the received speech data using a second speaker recognition algorithm such as template matching program, for example (i.e., the server biometric algorithm is a speaker recognition algorithm). If the second speaker recognition algorithm determines that the speech data received by the server matches speech data in the database of authorized users, the server may grant access to the user of the client. Therefore, using user identification, a server system may act as a gateway controller for users to gain access to a network.

At step 406, the server system connects to remote systems and may allow the user to perform transactions or operations. In another embodiment, the server system may optionally re-execute step 405 as discussed above. Accordingly, the server may send commands to the client to request that the user provide additional biometric data using the biometric input device. Therefore, the server may continuously monitor the biometrics of the user to improve the accuracy of the user identification and improve security of the client-server system.

Embodiments of the present invention are particularly useful in client-server systems where the client may be considered to have limited system resources when compared with the resources available on the server. For example, a client may be a portable cell phone, pager, personal digital assistant, or other portable system with limited data processing resources. Such client systems may utilize less powerful processors, smaller RAM's, smaller ROM's, or smaller hard drives compared to more powerful server systems. Even personal computer client systems may be considered to have limited system resources when compared to larger, more powerful server systems. Therefore, in one embodiment of the present invention, a simplified biometric algorithm is used on the client such that the biometric algorithm is operable using the more limited resources of the client. On the other hand, a computationally more burdensome biometric algorithm is used on the server to take advantage of the additional resources available on the server system. The two biometric algorithms may then be used together to provide enhanced security of the overall client-server system.

Thus, according to one embodiment of the present invention, a client utilizes a first biometric algorithm tailored to run on the limited resources of the client, and a second system resource intensive biometric algorithm is utilized on the server. An exemplary embodiment is a speaker recognition client-server system. In one embodiment, a speaker recognition algorithm on the client may be a neural network. A neural network may be a time independent clustering classifier that is looking to find distinct groups of speech features that define a word. For a client with limited resources, the neural network's implementation must be limited. A neural network may be limited by constraining the resolution of input vectors received by the neural network and by constraining the number of hidden nodes or layers of the network. Generally, the frequency domain transform of the time domain speech input signal serves as the feature space for a neural network speaker recognition algorithm. A basic classification feature vector neural network input may be derived from a speech input signal by partitioning the speech frequency range into discrete energy histogram bins. Therefore, the computational burden on the client may be reduced by constraining the frequency resolution of the feature vector fed into the neural network. This may be accomplished by putting limits on the Fast Fourier Transform used to generate the feature vector. Similarly, a neural network structure utilizing fewer hidden nodes or layers may be employed to further reduce the computational burden of the first biometric algorithm on the client system.

On the other hand, a server system may have adequate memory and processing power to support sophisticated computationally intensive calculations required to implement more complex and accurate biometric algorithms that may work to complement the biometric algorithms on the client. A more complex biometric algorithm may be able to distinguish small differences between a large number of pattern classes to support identification of a user in a large database of authorized users of the server system. In one embodiment, the server implements a speaker recognition algorithm using a template matching algorithm. The template matching algorithm may include Hidden Markov Models, for example. In a speaker recognition application, a Hidden Markov Model is a time dependent statistical state machine that is looking for the probability of a current phoneme to follow a preceding phoneme. The Hidden Markov Model may avoid redundant correlation searches by predicting the most likely phoneme to occur next based on previous sounds spoken and general training (e.g., a priori training). This process may require an accurate and computationally intensive Fourier Transform as well as a very fast CPU to continuously evaluate all random state machine models of each word. Such capabilities may be available on a server, whereas they may be unavailable on a client system.

In another embodiment of the present invention, significant advantages are achieved by leveraging the synergy of two, largely independent, sequential biometric security algorithms, one running on the client and the other on the server. The independent biometric algorithms operating on the client and server may include stochastic algorithms, template matching algorithms, or clustering algorithms. Exemplary embodiments of the present invention may include combinations of neural networks, Hidden Markov Models, or dynamic time warping algorithms implemented on either the client or the server. Generally, when these algorithms operate on different information, a multiplicative increase in security confidence may be achieved. In one exemplary embodiment, the biometric algorithm on the client is a neural network for performing user verification (e.g., speaker verification), and the biometric algorithm on the server is a template matching algorithm utilizing Hidden Markov Models for performing user identification. Neural networks and Hidden Markov Models complement each other in such an application because neural networks may be implemented on a system with limited resources to recognize a small vocabulary for user verification (e.g., a password for a particular user), and Hidden Markov Models may be implemented on a system with more processing power to accurately perform user identification from a large database of users and for a large vocabulary. As previously mentioned, a neural network is a time independent pattern grouping classifier that works best when groups of sound features that define a word are farther apart from other word feature groups, and hence, it has no information about the transition probabilities between two phonemes or words. Hidden Markov Models, on the other hand, do no explicit feature grouping, and predicts a word (or user) by searching a huge search tree using the statistical transition probabilities between sounds.

Furthermore, embodiments of the present invention have the additional advantage of allowing for user verification on a client prior to transmission of biometric data to a server across a potentially noisy communication channel. The client system may utilize less computation power because it is receiving the biometric data prior to any distortion caused by the communication channel. Therefore, the client generally will have a higher signal to noise ratio than the server. Moreover, the client may only be required to verify a user (e.g., recognize a unique biometric signature such as a password or digital fingerprint), rather than identify, for example, vocabulary independent speech data out of a database of speech data for each authorized user. Hence, given the low system resource requirements and superior signal to noise ratio of such an embodiment, the client is well suited for speaker verification. On the other hand, the signal sent to the server (e.g., in a telephony application) is often signal conditioned (i.e., pre-filtered) and may receive significant communication channel filtering, noise, and echoes that may serve to substantially reduce the ability of the server to verify a user's unique voice password with a high verification confidence. However, because of the superior computational power commonly available, the server is well suited for identification of particular users in a database based on biometric data transmitted from a client across a potentially noisy channel.

Figure 5A:
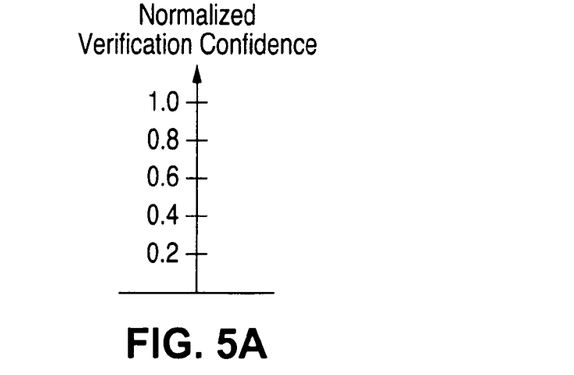
FIG. 5A-C illustrates a client-server system utilizing a verification confidence value according to one embodiment of the present invention.

In one embodiment of the present invention, a verification confidence value may be generated on the client system and utilized to enhance the security of the client-server system. The verification confidence value is a value that indicates the likelihood of a correct user verification in the client. In other words, the client biometric algorithm may return a value indicating the level of certainty that the authorization of the user of the client is a correct authorization rather than an incorrect authorization. FIG. 5A illustrates a normalized verification confidence graph to help illustrate various embodiments of the present invention. The normalized verification confidence values range from 0 to 1. According to the various embodiments described in more detail below, the client system or the server system, or both, may utilize the verification confidence value to invoke additional algorithms for increasing the security of the client-server system.

Figure 5B:
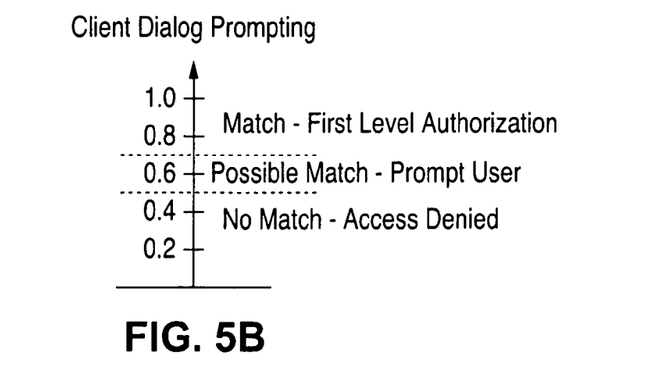

FIG. 5B illustrates one use of the normalized verification confidence value according to one embodiment of the present invention. According to FIG. 5B, the verification confidence value is returned by the client biometric algorithm and classified into one of three regions: match, possible match, and no match. When the verification confidence value falls in the first match range, the client biometric algorithm may grant a first level authorization. When the verification confidence value falls in the third no match range, the client biometric algorithm may deny a first level authorization. However, when the verification confidence value falls in the second possible match range, the client biometric algorithm may execute a procedure for increasing the confidence of the client system. For example, the client system may prompt the user for additional biometric data such as a second password or personal information such as a mother's maiden name. For another example, the client system may prompt the user for other biometric data such as a second fingerprint from another finger, a second eye scan, or various combinations if multiple biometric input devices are available.

Figure 5C:
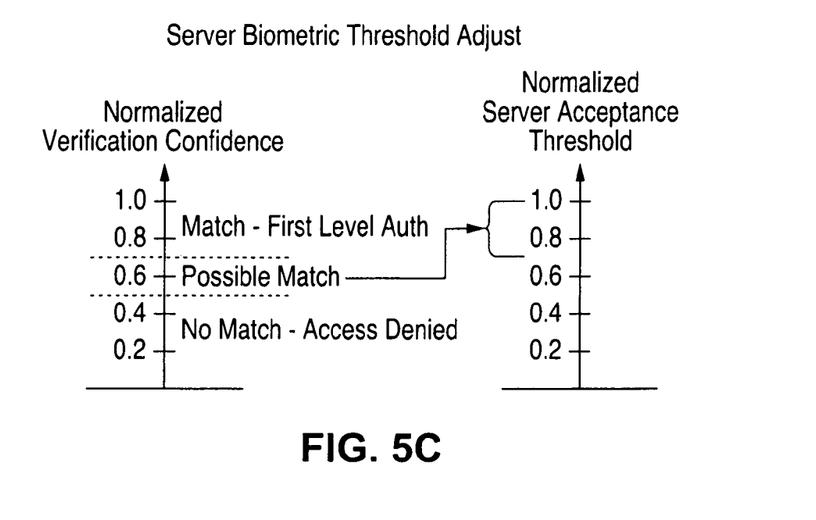

Features and advantages of the present invention include transmitting control information from the client system to the server system to enhance security of the client-server system. FIG. 5C illustrates another use of the normalized verification confidence value according to another embodiment of the present invention. According to FIG. 5C, the verification confidence value is returned by the client biometric algorithm and again classified into one of three regions: match, possible match, and no match. When the verification confidence value falls in the first match range, the client biometric algorithm may grant a first level authorization. When the verification confidence value falls in the third no match range, the client biometric algorithm may deny a first level authorization. However, when the verification confidence value falls in the second possible match range, the client biometric algorithm may grant first level authorization and transmit the verification confidence level to the server system for adjusting the acceptance threshold of the server biometric algorithm. For example, the server system may receive the verification confidence value from the client system and adjust the parameters of a template matching speaker recognition algorithm to require a higher threshold before returning a second level authorization. In one embodiment, a range of verification confidence values may map to a corresponding range of second level authorization thresholds for the server biometric algorithm according to user defined relations. For example, if the client biometric algorithm returns a match and generates a first level authorization, then a server system may use an acceptance threshold of 70% (i.e., 0.7 normalized) in the second level authorization. However, if the client biometric algorithm returns a possible match, then the client may transmit the verification confidence value to the server. The server may receive the verification confidence level and adjust the acceptance threshold of the server biometric algorithm to increase the confidence required for a second level authorization (e.g., from 0.7 to 0.8).

According to another embodiment of the present invention, the verification confidence value is returned by the client biometric algorithm and again classified into one of three regions: match, possible match, and no match. When the verification confidence value falls in the first match range, the client biometric algorithm may grant a first level authorization. When the verification confidence value falls in the third no match range, the client biometric algorithm may deny a first level authorization. However, when the verification confidence value falls in the second possible match range, the client biometric algorithm may grant first level authorization and transmit the verification confidence level to the server system for controlling the functionality of server system algorithms. In one embodiment, when the server system receives a verification confidence level in the possible match range, the server system may execute an algorithm for periodically re-identifying the user in the database of users (i.e., re-executing the server biometric algorithm second level authorization procedure). In another embodiment, the server system may transmit dialogs prompts to the client. For example, the server may signal the client system to prompt the user for additional biometric data. Accordingly, the server may use the additional biometric data for repeated analysis by the server biometric algorithm to increase the confidence of the client-server system that the user is an authorized user. In another embodiment, the server adjusts spending limits or site restrictions on the user in accordance with the verification confidence value. For example, if the verification is in the possible match range, the server system may reduce the maximum amount of money the user may spend without re-establishing the first and second level security authorizations. The server may also restrict access from certain sites such as adult web sites if the verification confidence value is within the possible match range.

Figure 6:
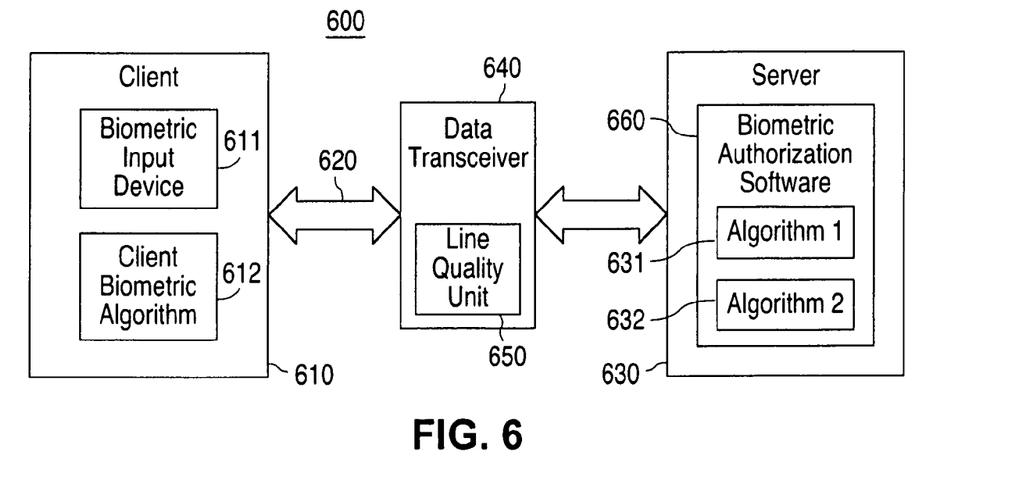
FIG. 6 illustrates a client-server system utilizing a line quality measure of the communication channel between the client and the server to further enhance the security according to another embodiment of the present invention.

FIG. 6 illustrates a client-server system 600 utilizing a line quality measure of the communication channel between the client and the server to further enhance the security of the client-server system according to another embodiment of the present invention. Client-server system 600 includes a client system 610 having a biometric input device 611 and a client biometric algorithm 612 for performing a first level authorization of a user. The client system 610 is coupled to a server system 630 over a communication channel 620. A data transceiver 640 is coupled to the communication channel 620 for transmitting data between the client system and server system. The data transceiver 640 includes a line quality unit 650 for measuring the line quality of the communication channel 620. Line quality measures the degree that the communication channel 620 transmits information undistorted. It is to be understood that in other embodiments, the data transceiver and the line quality unit could be integrated into the server system 630. The data transceiver 640 and line quality unit 650 are coupled to the server system 630 for transmitting data and a line quality measure to the server system 630.

Figure 7:
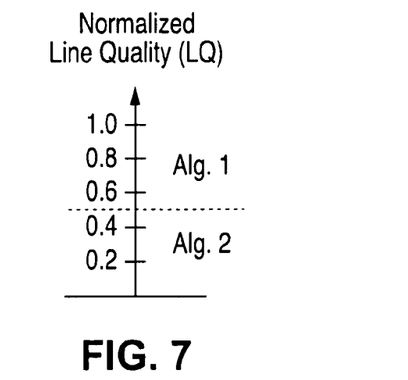
FIG. 7 illustrates a normalized line quality plot and the use of multiple server biometric algorithms according to one embodiment of the present invention.
Figure 8:
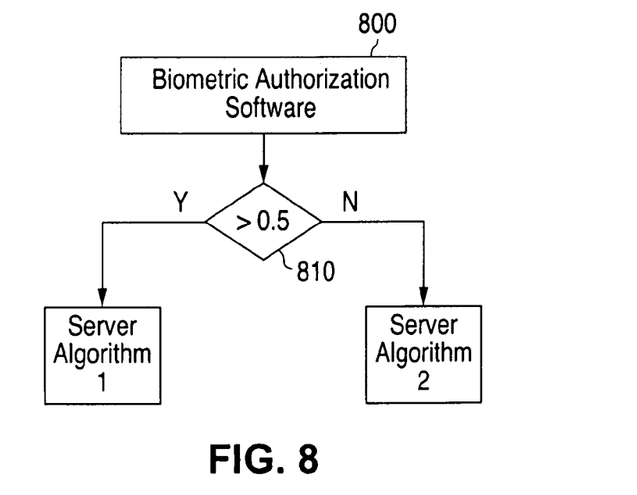
FIG. 8 is a flow chart illustrating the operation of the biometric authorization software according to one embodiment of the present invention.

In one embodiment, the server system 630 may include a biometric authorization software package 660 that incorporates multiple biometric algorithms 631 and 632. The biometric authorization software 660 receives the line quality measure and may execute different biometric algorithms depending upon the line quality measure received from the line quality unit 650. For example, FIG. 7 illustrates a normalized line quality plot. If the line quality measure received from the line quality unit 650 is above 0.5, then a first server biometric algorithm 631 may be used to perform the second level authorization. However, if the line quality measure received from the line quality unit 650 is below 0.5, then a second server biometric algorithm 632 may be used to perform the second level authorization. FIG. 8 is a flow chart illustrating the operation of the biometric authorization software 660 according to one embodiment of the present invention. The biometric authorization software 660 may be invoked at the beginning of an authorization procedure at 800. The server system 630 and biometric authorization software 660 may receive the line quality measure and determine if the line quality measure is above or below a predetermined normalized value (e.g., 0.5) at 810. If the line quality is above the predetermine value, then the first server biometric algorithm is used to analyze the incoming data. However, if the line quality is below the predetermine value, then the second server biometric algorithm is used to analyze the incoming data. Of course, it is to be understood that other delineation values could be used to select between different biometric algorithms (e.g., a line quality measure of 0.6 could be used). Additionally, more than two server biometric algorithms could be available in accordance with a range of line quality measures. Accordingly, a user defined relation between possible line quality measures and each corresponding algorithm could be defined.

Figure 9:
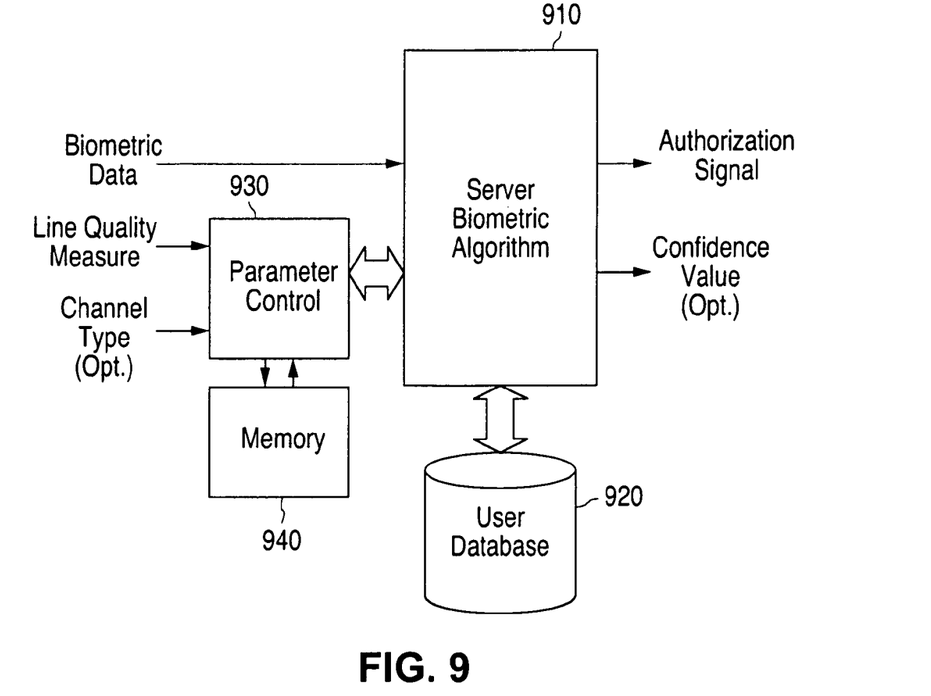
FIG. 9 illustrates the use of a line quality measure, channel type signal, and server biometric algorithm confidence value according to another embodiment of the present invention.

FIG. 9 illustrates the use of a line quality measure according to another embodiment of the present invention. According to the system shown in FIG. 9, rather than invoking distinct server biometric algorithms, a single biometric algorithm could be used that is loaded with different algorithm parameters depending upon the line quality measure received by the server system. The server system includes a server biometric algorithm 910 that receives biometric data as an input. The server biometric algorithm is coupled to a user database 920 which stores characteristic biometric data for authorized users. Additionally, the system includes a parameter control unit 930 which is coupled to the server biometric algorithm 910. It is to be understood that the server biometric algorithm 910 and the parameter control unit 930 could be implemented in hardware, software, or a combination of hardware and software. The parameter control unit 930 receives the line quality measure and may adjust the input parameters to the server biometric algorithm to compensate for variations in the line quality. For example, if the line quality measure is high, indicating low distortion, then the server biometric algorithm may be loaded with a first set of parameters, and if the line quality measure is low, indicating high distortion, then the server biometric algorithm may be loaded with a second set of parameters. Exemplary parameters that may be varied include ID rate (i.e., the rate at which the user is re-identified by the server biometric algorithm during a access session) and acceptance threshold. The parameter control unit 930 may be coupled to a memory 940 for storing different parameters, for example. The memory 940 may be an RAM, ROM, non-volatile memory, or part of the memory used for the user database 920.

In one embodiment, the line quality measure is a signal to noise ratio ("SNR"). The SNR compares the signal power to the noise power in a received signal. Achieving adequate results from the server biometric algorithm may require minimum SNR values. For example, if an SNR>4 is required to achieve a 95% accuracy in the in the second level authorization, then the signal power is required to be 4 times greater than the noise power. Thus, it can be seen that the relation between the required SNR value and the system performance is application dependent. Therefore, a server system according to one embodiment of the present invention may receive a line quality SNR value, and modify the rate at which the user is re-identified by the server biometric algorithm (i.e., ID rate), as well as the acceptance threshold of the server biometric algorithm. For example, in one exemplary embodiment, a system designer may classify SNR values received from the line quality unit as good, acceptable, marginal, or poor. The ID rates and acceptance thresholds for each classification of the SNR are shown in Table 1 below.

TABLE 1

| SNR Classification | ID Rate | Acceptance Threshold | Confidence Value |
| --- | --- | --- | --- |
| Good | Low | Minimum | High |
| Acceptable | Normal | Normal | Average |
| Marginal | High | High | Low |
| Poor | Very High | Maximum | Very Low |

Table 1 illustrates that if a received line quality SNR value is classified as "good," then a "low" ID rate and "minimum" acceptance threshold may be used. Additionally, if a SNR value is classified as "acceptable," then a "normal" ID rate and "normal" acceptance threshold may be used. Furthermore, if a SNR value is classified as "marginal," then a "high" ID rate and "high" acceptance threshold should be used to enhance security. Finally, if a SNR value is classified as "poor," then a "very high" ID rate and a "maximum" acceptance threshold should be used to enhance security. It is to be understood that the classifications given in this example, such as "good," "acceptable," "low," and "maximum" are relative performance descriptions which a system designer skilled in the art would be able to manipulate and adjust across different design constraints to achieve the full features and advantages of the present embodiment of the invention. Of course, other techniques could be used for relating the received values of SNR to the ID rate and acceptance threshold utilized by the server biometric algorithm. Additionally, other server biometric algorithm parameters could be modified in response to different line quality SNR values received.

FIG. 9 also illustrates the optional generation of a confidence value according to another embodiment of the present invention. Accordingly, the server biometric algorithm 910 may generate both a second level security authorization and a confidence value. Confidence values may be generated by the server biometric algorithm with the authorizations to indicate that the user is an authorized user and the confidence level that the authorization is a correct authorization. Confidence values may be classified for SNR's as shown in Table 1 above according to one embodiment of the present invention. Additionally, a range of confidence values could be generated and utilized to vary such things as ID rate and user access rights on the server and remote systems.

FIG. 9 also illustrates the optional use of a channel type signal according to another embodiment of the present invention. A channel type signal may indicate that the current communication channel between the client system and server system is a particular type of medium such as, for example, a wireless communication channel, analog phone line, modem, DSL, ethernet, or other type of communication channel. The channel type may also indicate the type of client system that is accessing the server system. For example, the channel type may indicate that the client system is a wireless phone, home analog phone, PDA, or personal computer.

Figure 10:
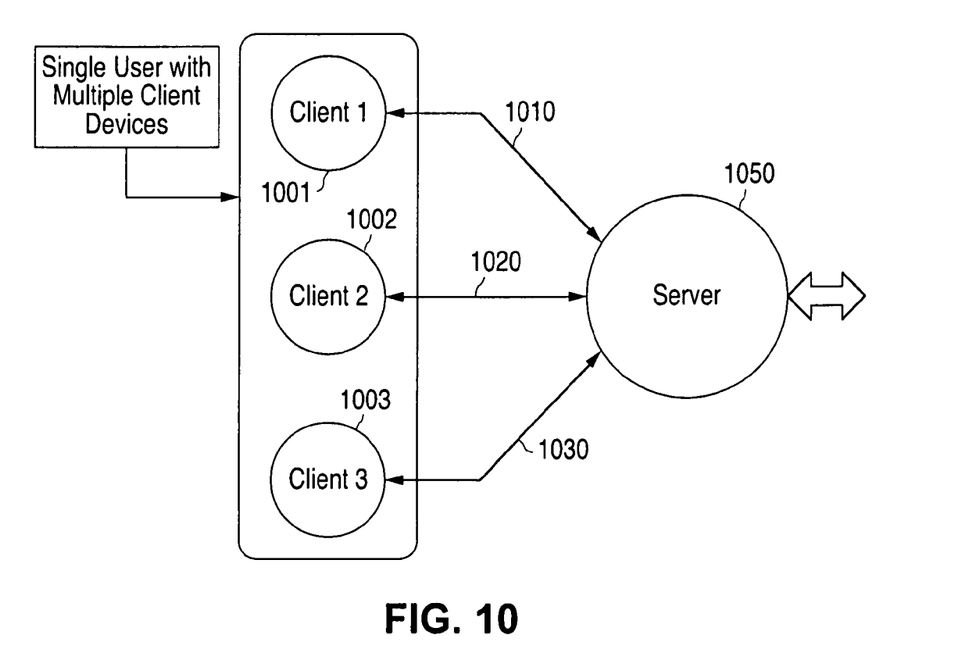
FIG. 10 illustrates an embodiment of the present invention that may utilize the channel type signal.

FIG. 10 illustrates an embodiment of the present invention that may utilize the channel type signal. FIG. 10 shows a system where a single user may have multiple client systems for accessing a server system. A single user may have, for example, a wireless phone client system 1001, a home analog phone client system 1002, and a personal computer client system 1003. Of course, other client systems could also be used. The wireless phone client system 1001 may be coupled to the server over a wireless communication channel 1010. Additionally, the home analog phone client system 1002 may be coupled to the server over wired communication channel 1020 including an analog phone line between a household and a central telephone office. Furthermore, the personal computer client system 1002 may be coupled to the server over digital communication channel 1030 such as a modem, DSL, line, or ethernet communication channel. The channel type signal may include information for identifying the particular communication channel, the particular type of client system, or both. The server system may receive the channel type signal in parameter control unit 930 and load the biometric algorithm with unique parameters corresponding to the particular communication channel, type of client system, or both. The channel type signal may be utilized optionally with the line quality measure signal, or alternatively, the channel type signal may be utilized alone without the line quality signal.

In another embodiment of the present invention, the verification confidence value discussed above may trigger a handshake sequence between the client and the server. In one embodiment, the handshake authorization sequence must be secured by the successful completion of both first and second level security authorizations before the user will be allowed to access the client-server system and remote systems when the verification confidence value falls below a predetermined threshold value. For example, in one embodiment, the client may verify a user, and then transmit a first authorization signal and biometric data to the server for user identification. However, the user will be denied access to both the client and the server until the user has been both verified by the client and identified by the server. Accordingly, in response to receiving the first authorization signal and the biometric data, the server will perform an identification operation. If the user is identified, then the server may transmit a second authorization signal back to the client indicating that the user has been identified, thus completing the handshake sequence.

According to one embodiment, the first level security authorization signal may be used to trigger the server system to execute different subroutines depending on whether or not the user of the client is an authorized user. For example, if the first level security authorization signal indicates the user of the client system has not been successfully verified as the authorized user (e.g., the client system is a stolen cellular phone or PDA), then such an event may trigger the execution of an identification script designed to obtain identification information about the user in an effort to determine the identity of the user. The identification script may be executed by the server or client, for example. In one embodiment, if the first level security authorization or the handshake sequence fails, indicating an unauthorized user, then biometric data in the client is retrieved by the server and stored for later identification of the unauthorized user. For example, digital fingerprints, voiceprints, handprints, or other biometric data may be transmitted to the server and stored for later identification of the unauthorized user. In another embodiment, the policing script may execute routines to generate synthesized audio prompts to obtain further identification from the user. For example, if the user is an unauthorized user of the client system, synthesized audio prompts may ask additional questions (e.g., where would he/she like the goods delivered) to obtain more information about the identity of the user.

In one embodiment of the present invention, when the first level of security authorization has not been satisfied, when a verification confidence value is below a predetermined threshold, or when a complete handshake sequence has not been completed, an identification script may be executed which prompts the user for additional information in an attempt to secure complete first and second level security authorization. For example, the client may prompt the user for personal biographic information such as place of birth, mother's maiden name, social security number, or other information about an authorized user of the client that would generally be known only to the authorized user. In one embodiment, the biographic information may be pre-loaded into the client by the authorized user for use by the first biometric algorithm. In another embodiment, the biographic information may be loaded into the client and stored on the server for use by the second biometric algorithm. In another embodiment, a portion of the biographic information may be stored on the client for verification (e.g., a voice print of the user saying his mother's maiden name), and another portion of the biographic information may be stored on the server (e.g., an utterance comprising a favorite phrase). Accordingly, when authorization has failed, or when the verification confidence is within a first range, the client and server may individually or jointly prompt the user for additional biometric data inputs in an effort to authorize the user.

In another embodiment, the authorization limitation criteria may be transmitted to the server system to implement further security features into the client-server system. For example, if the client verifies that the user is a particular authorized user, then subsequent network access may be tailored according to certain predefined criteria. In other words, the authorization limitation criteria may be used by the server to limit online transactions and other capabilities of the user. The authorization limitation criteria may be used to implement spending limits (i.e., allowable spending amounts). Additionally, the authorization limitation criteria may be used to restrict access to particular remote resources, such as particular internet sites. This feature may be particularly useful for blocking access to certain adult sites by children. In one embodiment, the authorization limitation criteria may be used to limit allowable network connection time.

Having fully described at least one embodiment of the present invention, other equivalent or alternative methods of implementing the client server security system and method according to the present invention will be apparent to those skilled in the art. The invention has been described above by way of illustration, and the specific embodiments disclosed are not intended to limit the invention to the particular forms disclosed.

What is claimed is:

1. A method of performing a secured transaction on a server system comprising:
   receiving a first level security authorization signal on the server system from a client system, wherein the first level security authorization signal indicates that the client system has authorized a user of the client based on biometric data gathered from the user using a first biometric input device on the client system;
   receiving the biometric data on the server system from the client system;
   executing a second level security authorization, the second level security authorization including analyzing the biometric data using a first biometric algorithm on the server system; and
   generating a second level security authorization signal on the server system when the first biometric algorithm indicates that the biometric data corresponds to one of a plurality of users authorized to access the server system.

2. The method of claim 1 wherein the first level security authorization signal indicates that a user has been authorized on the client system by a second biometric algorithm on the client system.

3. The method of claim 1 wherein the first level security authorization signal indicates that a user has not been authorized on a client system by a second biometric algorithm on the client system.

4. The method of claim 1 further comprising re-executing the second level security authorization on the server system.

5. The method of claim 1 further comprising receiving control information from the client system.

6. The method of claim 5 wherein the control information comprises a verification confidence value.

7. The method of claim 6 further comprising modifying an acceptance threshold of the first biometric algorithm in accordance with the verification confidence value.

8. The method of claim 6 further comprising analyzing second biometric data using the first biometric algorithm when the verification confidence value within a first range.

9. The method of claim 6 further comprising prompting the user for additional biometric information when the verification confidence value is within a first range.

10. The method of claim 5 wherein the control information comprises a authorization limitation criteria.

11. The method of claim 10 further comprising restricting access to remote resources in accordance with the authorization limitation criteria.

12. The method of claim 10 further comprising limiting allowable spending amounts in accordance with the authorization limitation criteria.

13. The method of claim 10 further comprising limiting allowable network connection time in accordance with the authorization limitation criteria.

14. The method of claim 1 further comprising providing access to a plurality of server resources in accordance with the first and second level authorization signals.

15. The method of claim 1 further comprising providing access to a plurality of remote network resources in accordance with the first and second level authorization signals.

16. The method of claim 1 further comprising executing an identification script to obtain identification information about the user.

17. The method of claim 1 further comprising retrieving biometric data from the client and storing the biometric data on the server for later identification of the user.

18. The method of claim 17 wherein the biometric data is a digital fingerprint.

19. The method of claim 17 wherein the biometric data is a digital voice print.

20. The method of claim 1 further comprising receiving a line quality measure in the server system, and in accordance therewith, selecting one of a plurality of server biometric algorithms for executing the second level security authorization.

21. The method of claim 1 further comprising receiving a line quality measure in the server system, and in accordance therewith, loading the first biometric algorithm with a first input parameter value when the line quality measure is in a first range, and loading the first biometric algorithm with a second input parameter value when the line quality measure is in a second range.

22. The method of claim 1 further comprising receiving a channel type signal in the server system, and in accordance therewith, loading the first biometric algorithm with a first input parameter value when the channel type has a first value, and loading the first biometric algorithm with a second input parameter value when the channel type has a second value.

23. A method of performing a secured transaction on a client system comprising:
   receiving biometric data in the client system gathered from a user using a first biometric input device;
   analyzing a first portion of the biometric data using a first biometric algorithm on the client system wherein the first biometric algorithm denies access to the client system if the first portion of biometric data does not correspond to an authorized user;
   generating a first level security authorization signal on the client system when the first biometric algorithm indicates that the first portion of the biometric data corresponds to an authorized user;
   transmitting the first level security authorization signal and a second portion of the biometric data to a server system, the second portion of biometric being analyzed by a second biometric algorithm on the server; and
   accessing resources on the server system through the client system when the second biometric algorithm provides a second level security authorization.

24. The method of claim 23 further comprising generating a verification confidence value and transmitting the verification confidence level to the server system.

25. The method of claim 24 further comprising modifying an acceptance threshold of the second biometric algorithm in accordance with the verification confidence value.

26. The method of claim 24 further comprising transmitting second biometric data to the server system and analyzing the second biometric data using the second biometric algorithm when the verification confidence value is within a first range.

27. The method of claim 23 further comprising generating authorization limitation criteria and transmitting the authorization limitation criteria to the server system.

28. The method of claim 27 wherein the authorization limitation criteria comprises remote resource access restrictions.

29. The method of claim 27 wherein the authorization limitation criteria comprises spending amount limitations.

30. The method of claim 23 wherein the first portion of the biometric data is speech data and the first biometric algorithm includes a speaker recognition algorithm.

31. The method of claim 30 wherein the speech data comprises a password.

32. The method of claim 23 wherein the second portion of the biometric data is speech data and the second biometric algorithm includes a speaker recognition algorithm.

33. The method of claim 32 wherein the speech data comprises an utterance.

34. The method of claim 23 wherein client system is a portable media player, a smart card, a personal computer system, a thin client computer system, a portable phone, a personal digital assistant, an electronic watch, an internet appliance, an electronic watch, a set-top box or an automotive information system.

* * * * *